United States Patent [19]

Van Weezenbeek

[11] Patent Number: 4,943,186

[45] Date of Patent: Jul. 24, 1990

[54] DEVICE FOR THE DISPLACEMENT OF SEDIMENT UNDER WATER AND PROCESS FOR THE USE OF SUCH A DEVICE

[76] Inventor: Reijer N. Van Weezenbeek, Torenweg 14, 3235 NS Rockanje, Netherlands

[21] Appl. No.: 330,442

[22] Filed: Mar. 29, 1989

Related U.S. Application Data

[63] Continuation of Ser. No. 28,901, Mar. 23, 1987, abandoned.

[30] Foreign Application Priority Data

Apr. 14, 1986 [NL] Netherlands ............... 8600941

[51] Int. Cl.⁵ ............................................. E02B 3/02
[52] U.S. Cl. ............................................. 405/73; 37/78
[58] Field of Search ............... 405/52, 73, 74; 37/62, 37/63, 75, 76, 78

[56] References Cited

U.S. PATENT DOCUMENTS

| | | | |
|---|---|---|---|
| 1,525,727 | 2/1925 | Falley | 405/73 |
| 1,531,743 | 3/1925 | Falley | 405/73 |
| 1,572,472 | 2/1926 | Doren . | |

FOREIGN PATENT DOCUMENTS

| | | |
|---|---|---|
| 0119653 | 9/1984 | European Pat. Off. . |
| 184369 | 5/1907 | Fed. Rep. of Germany . |
| 1634017 | 1/1971 | Fed. Rep. of Germany . |
| 673627 | 6/1952 | United Kingdom . |

Primary Examiner—David H. Corbin
Attorney, Agent, or Firm—Parmelee, Bollinger & Bramblett

[57] ABSTRACT

Device and process for the displacement of sediment under water by means of water jets which liquify the sediment so that it flows away under water without polluting the surface water, the improvement being that the device has laterally directed outflow openings, which reach areas out of reach of the downwardly directed jets and by means of which soil accumulations such as ridges can be leveled.

6 Claims, 2 Drawing Sheets

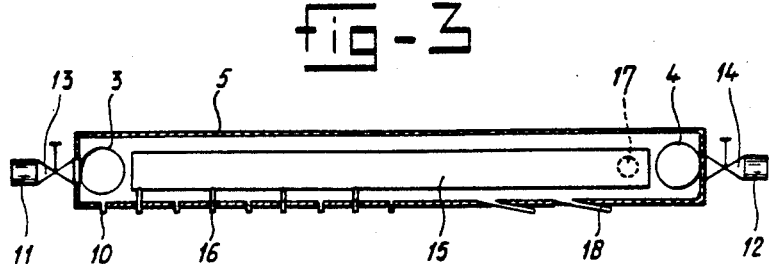
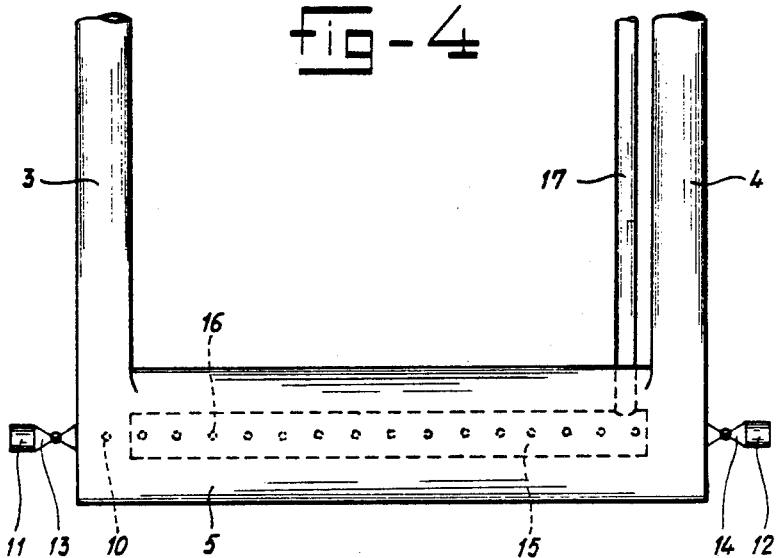
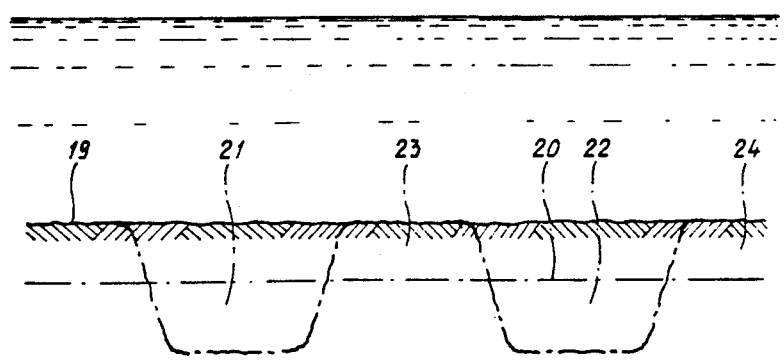

DEVICE FOR THE DISPLACEMENT OF SEDIMENT UNDER WATER AND PROCESS FOR THE USE OF SUCH A DEVICE

This is a continuation of Ser. No. 028,901, filed 3/23/87, now abandoned.

The invention relates in the first place to a device for the displacement of sediment under water, comprising a pipe which is or can be coupled to a means of transport, such as a vessel, said pipe being provided with downward-directed outflow openings, and being connected to a source of water under pressure.

Such a device is known from No. DE-A-16 34 017 and from Dutch Patent Application No. 8300990, which has been laid open for inspection.

In the device known from No. DE-A-1634017 use is made of a pipe with outflow openings which are directed at a scraper blade with which a layer of the bottom to be processed is removed and carried away by means of the water jets in such a way that the material dislodged from the bottom is finely divided over the water area. With this process pollution of the water often takes place near the surface.

Dutch Patent Application No. 8300990, which has been laid open for inspection, discloses a process in which by means of a pipe provided with outflow openings such a small quantity of water is injected into the layer to be processed that this layer proceeds to act like a liquid and then, through its greater specific gravity, flows to an area with lower bottom, which is present or has been made beforehand, or flows out over the flat bottom.

This known process has already proved itself capable of removing in a very short time layers of sludge from deposit areas such as harbour areas, using relatively little energy. This liquefied sludge does not pass into the surface water, which is thus not polluted, and it flows away into channels lower down, or in the direction of a connecting river or an artificially made well, where a dredge pump can take care of its discharge.

This known process and the one known from No. DE-A-16 34 017 are aimed at the removal of sludge deposits. Sludge deposits can, however, exhibit great differences in composition depending on the water content and granule size and the percentage of sand present in the sludge, and they are sometimes found in difficultly accessible places such as against quay walls and under jetties.

The object of the invention is then to produce a device by which the process known from Dutch Patent Application No. 8300990 can be used in a more efficient manner, taking into account the differing compositions of layers to be processed, and which in particular envisages a device by means of which, with the same output and pressure from the source, a variable working width is possible and sand can also be shifted in the same way, and in consequence thereof deepening a waterway can be carried out more efficiently.

The first measure proposed by the invention is that the pipe should also have outflow openings which are directed essentially along the longitudinal axis of the pipe.

With the water jets coming out of these outflow openings, the working area is widened, and it is possible to process deposits along quay walls and under jetties without having to go too close up to them. It is surprising that even with horizontally directed jets one can make sediment so fluid that it runs away by itself. In principle, part of the horizontal injection energy will be lost upwards, and one has to beware of undesirable eddies near obstacles which the jet can collide with, and one can therefore not expect a good result as a matter of course.

These openings can be disposed at the ends of the pipe, but they can also be provided between the ends and, viewed from halfway along the pipe, they can be directed in opposite directions, forming an acute angle with the longitudinal axis of the pipe.

Another manner in which according to the invention an adaptation can be made to the composition of the sediment is that in which at least part of the downward-directed outflow openings can be switched off. The consequence of this is that the sediment layer to be processed can be injected at a smaller or greater number of places and with a correspondingly adapted smaller or greater quantity of water. If there is a greater sand content in the sediment, a greater quantity of water is desired in order to get deeper penetration by the water jets, partly because of the greater compactness of the sediment, and thus to liquefy a layer of greater depth or compactness. For the deepening over a large width of a water area such as a fairway, it is known to do this with a trailing hopper suction dredger. The trailing suction head of the trailing dredger makes channels in the bottom. In order to avoid this, one sails in a particular zigzag pattern. This extends the time and is not effective. The device according to the invention is now also suitable for evening out ridges or bumps remaining between the channels.

With the principle on which the process according to Dutch Patent Application No. 8300990—which has been laid open for inspection—is based, and in particular using the device according to the invention, it has now been found possible to simplify considerably this deepening of a water area, for the trailing dredger can now set to work according to a simpler—and thus quicker—pattern, after which, through use of the device according to the invention, the ridges or bumps remaining are caused to flow apart.

If the outflow openings which operate along the longitudinal axis of the pipe are used here, they will promote transverse flowing-away of the liquefied ridges or bumps. If a large number of downward-directed outflow openings are used, with an appropriately greater quantity of water, the ridges, which generally consist of sand and/or sludge, can be influenced over a sufficiently great depth with the water jets.

Depending on the sediment to be processed, these measures can be used individually or in combination.

The known device generally has a pipe length which corresponds to the width of the ship.

The pipe can, however, be made longer, or extension pieces can be fitted to it, thus further increasing the working width of the vertical or horizontal jets.

It is also possible according to the invention to design the device in such a way that the outflow of water from the longitudinally directed openings can be regulated independently of the outflow from the downward-directed openings.

This makes it possible to direct all energy either downwards or sideways, or both downwards and sideways.

The invention will now be explained in greater detail with reference to the drawing.

FIG. 3 shows an embodiment of the device according to the invention.

FIG. 4 shows a top view belonging to FIG. 3.

FIG. 5 serves to illustrate the process according to the invention.

Figure 1:
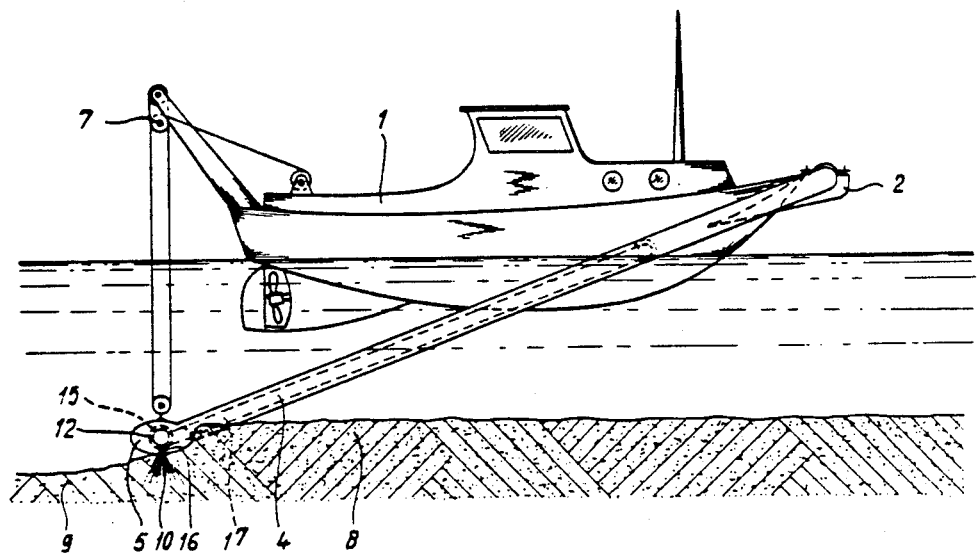
FIG. 1 shows an example of a device according to the invention, which is derived from the device shown in Patent Application No. 8300990.
Figure 2:
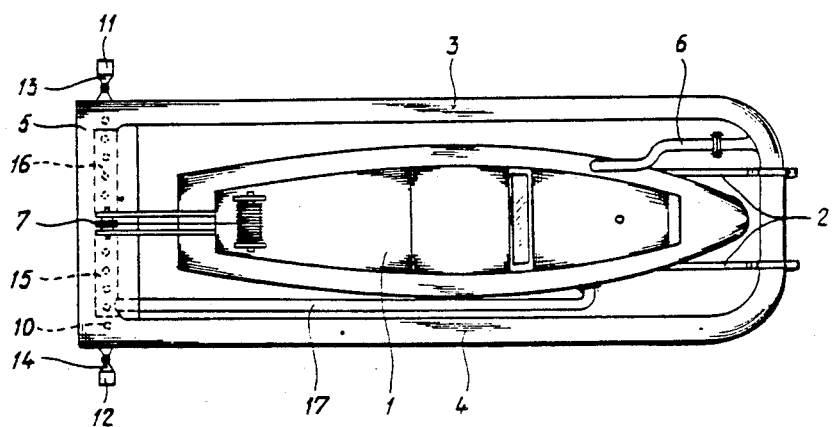
FIG. 2 is a top view of FIG. 1.

FIGS. 1 and 2 show a ship 1, at the front side of which, suspended from crane jibs, are pipes 3 and 4 which at the rear end are connected to each other by the pipe 5 running in the crosswise direction.

Water under pressure is fed to the pipes 3, 4 and 5 through the pipe 6 by means of a pump (not shown) located inboard.

The pipes 3, 4 and 5 can be lowered using the tackle 7.

The layer to be processed is indicated by 8 and the already processed area by 9.

The pipe 5 is provided at the bottom side with a number of outflow openings 10.

According to the invention, crosswise-directed outflow openings 11 and 12 are now added to the pipe 5 and are provided with valves 13 and 14. This means that a flow in the transverse direction can be produced, so that the working area is widened and the layer 8, which has been transformed to a thick liquid by the jet nozzles 10, is caused to flow away more readily.

FIG. 2 already indicates schematically that provision can be made in the pipe 5 for a pipe 15 with its own downward-directed outflow openings 16 (see also FIGS. 3 and 4), said pipe being fed with water under pressure by means of the pipe 17 from another water pump placed inboard.

All water feed pumps can suck up surface water.

The drawings show that the second pipe 15 with outflow openings 16 is situated inside the pipe 5.

When water is fed to the pipes 3 and 4, it flows only from the openings 10. If water is also fed to the pipes 17 and 15, outflow takes place from the openings 16. The quantity of water can then be doubled.

The outflow openings 11 and 12 directed in the longitudinal direction of the pipe are at the ends of the pipe, as shown in the drawing. Instead of this, or in addition to it, it is, however, possible to use outflow openings 18 which are directed downwards at an angle and face the ends, as shown in FIG. 3.

FIG. 5 shows schematically a bottom profile, which has to be deepened. The original depth is indicated by the line 19, and the desired depth by the line 20. Using a trailing hopper suction dredger, channels 21 and 22 can be made, between which, for example, ridges 23 and 24 remain.

If these ridges are now liquefied by water injection with the device according to the invention, then the tops of the ridges flow into the channels 21 and 22, and the desired level 20 is achieved.

The device shown can also be designed in a simpler way and have one pipe with closable openings in the bottom face or in the end walls.

Use of water jets working in the direction of the longitudinal axis also results in it being possible to reach places with the device according to the invention where it is not possible to work with a trailing hopper suction dredger, such as close to quay walls or other obstacles in the water, like mooring posts and the like.

I claim:

1. A device for the displacement of sediment under water comprising a pipe having a longitudinal axis with outer ends thereon and a plurality of downwardly directed outflow openings spaced along said longitudinal axis, means for lowering said pipe under water to the bottom of said water having sediment to be acted upon, a source of pressurized water connected to said pipe thereby providing a flow of pressurized water out of said downwardly directed outflow openings which are in contact with said sediment on said bottom for liquefying said sediment, the improvement comprising:

longitudinally directed outflow openings positioned in the outer ends of said pipe for directing water from opposite ends of said pipe substantially in the direction of said longitudinal axis, said longitudinally directed outflow openings are positioned in said pipe at a level above said downwardly directed outflow openings whereby water from the longitudinally directed outflow openings is useful in liquefying deposits of sediment around quay walls, pilings and similar structure in harbors.

2. The device as claimed in claim 1 wherein an additional pipe having a separate independently controlled water supply than said pipe is located inside said pipe and is provided with additional downwardly directed outflow openings extending downwardly to the same level as downwardly directed outflow openings of the said pipe.

3. The device as claimed in claim 2 wherein means are provided for selectively applying pressurized water to said outflow openings whereby at least a portion of said outflow openings can be turned off.

4. The device as claimed in claim 1 wherein means are provided for controlling the outflow of pressurized water from said longitudinally directed outflow openings independently of the outflow of pressurized water flow from said downwardly directed outflow openings.

5. A method for uniformly deepening a water bottom area, such as a fairway, over a wide width using a dredging device, said dredging device making channels separated by ridges, the improved method comprising the steps of employing the device of claim 1 for injecting pressurized water into the channels already formed by said dredging device.

6. The device as claimed in claim 1 wherein additional outflow openings are provided in said pipe between said outer ends of said pipe which additional outflow openings are directed downwardly and extend at an acute angle with respect to the longitudinal axis of said pipe such that part of said nozzles extend in one direction and the other part in another direction.

* * * * *